(12) United States Patent
Bertocchi

(10) Patent No.: US 12,408,688 B2
(45) Date of Patent: Sep. 9, 2025

(54) PLANT AND PROCESS FOR PRODUCING PUREE AND/OR JUICE STARTING FROM A FOOD PRODUCT OF VEGETABLE ORIGIN

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 682 days.

(21) Appl. No.: 17/624,215

(22) PCT Filed: Jun. 30, 2020

(86) PCT No.: PCT/IB2020/056161
§ 371 (c)(1),
(2) Date: Dec. 30, 2021

(87) PCT Pub. No.: WO2021/001752
PCT Pub. Date: Jan. 7, 2021

(65) Prior Publication Data
US 2022/0346418 A1 Nov. 3, 2022

(30) Foreign Application Priority Data

Jul. 1, 2019 (IT) .......................... 102019000010566

(51) Int. Cl.
*A23L 19/00* (2016.01)
*A23L 2/04* (2006.01)
*A23N 1/00* (2006.01)

(52) U.S. Cl.
CPC .................. *A23L 19/09* (2016.08); *A23L 2/04* (2013.01); *A23N 1/00* (2013.01)

(58) Field of Classification Search
None
See application file for complete search history.

(56) References Cited

U.S. PATENT DOCUMENTS 2,342,994 A * 2/1944 Atwood ..................... D01F 4/00
106/157.3
2,453,109 A * 11/1948 Macdowell ............... A23L 2/08
426/492

(Continued)

FOREIGN PATENT DOCUMENTS

EP 0511174 10/1992
EP 0850572 A2 7/1998

(Continued)

*Primary Examiner* — Thor S Campbell
(74) *Attorney, Agent, or Firm* — Maschoff Brennan

(57) ABSTRACT

A plant for producing juice and/or puree starting from a food product of vegetable origin, includes an extraction machine within which a starting food product is subject to an extraction step, to obtain an extracted food product and a waste product. The plant further includes a heat exchange apparatus positioned downstream of the extraction machine configured to heat or cool the food product from an inlet temperature to a predetermined outlet temperature. A a deaeration and/or concentration apparatus contains a predetermined quantity of the extracted food product and maintains the predetermined quantity of the extracted food product at a specified temperature and at a predetermined vacuum degree. The plant further includes a recirculation circuit including the extraction machine, the heat exchange apparatus and the deaeration and/or concentration apparatus for recirculating a predetermined quantity of heated or cooled, and deaerated and/or concentrated food product, into the extraction machine.

19 Claims, 11 Drawing Sheets

(56) References Cited

U.S. PATENT DOCUMENTS

| | | | | | |
|---|---|---|---|---|---|
| 2,941,889 | A | * | 6/1960 | Welch | A23L 7/10 |
| | | | | | 426/628 |
| 4,643,085 | A | | 2/1987 | Bertocchi | |
| 4,789,554 | A | * | 12/1988 | Scavone | B01D 3/38 |
| | | | | | 426/601 |
| 5,209,157 | A | * | 5/1993 | Sanchez Rodriguez | |
| | | | | | A23C 9/158 |
| | | | | | 99/453 |
| 5,598,772 | A | | 2/1997 | Catelli | |
| 5,993,876 | A | * | 11/1999 | Bertocchi | A23L 19/09 |
| | | | | | 426/388 |
| 9,282,762 | B2 | * | 3/2016 | Bertocchi | A23L 2/02 |
| 2004/0045451 | A1 | * | 3/2004 | Bertocchi | A23L 19/09 |
| | | | | | 99/485 |
| 2004/0265465 | A1 | * | 12/2004 | Daniels | A23L 2/76 |
| | | | | | 426/599 |
| 2007/0184157 | A1 | * | 8/2007 | Stegmaier | A23L 2/02 |
| | | | | | 426/399 |
| 2014/0106045 | A1 | * | 4/2014 | Bertocchi | A23N 1/00 |
| | | | | | 99/275 |
| 2022/0346418 | A1 | * | 11/2022 | Bertocchi | A23N 1/02 |

FOREIGN PATENT DOCUMENTS

| | | | |
|---|---|---|---|
| WO | 2012/028946 | A1 | 3/2012 |
| WO | 2012/160483 | A2 | 11/2012 |
| WO | 2018/225020 | A1 | 12/2018 |

* cited by examiner

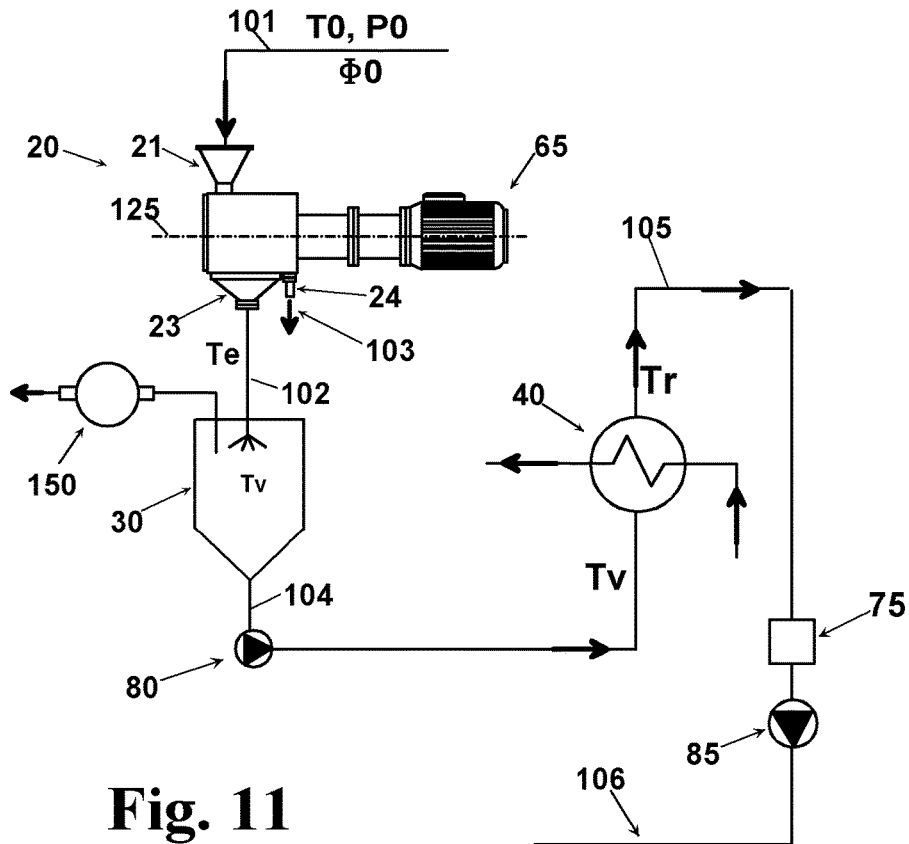
Fig. 11
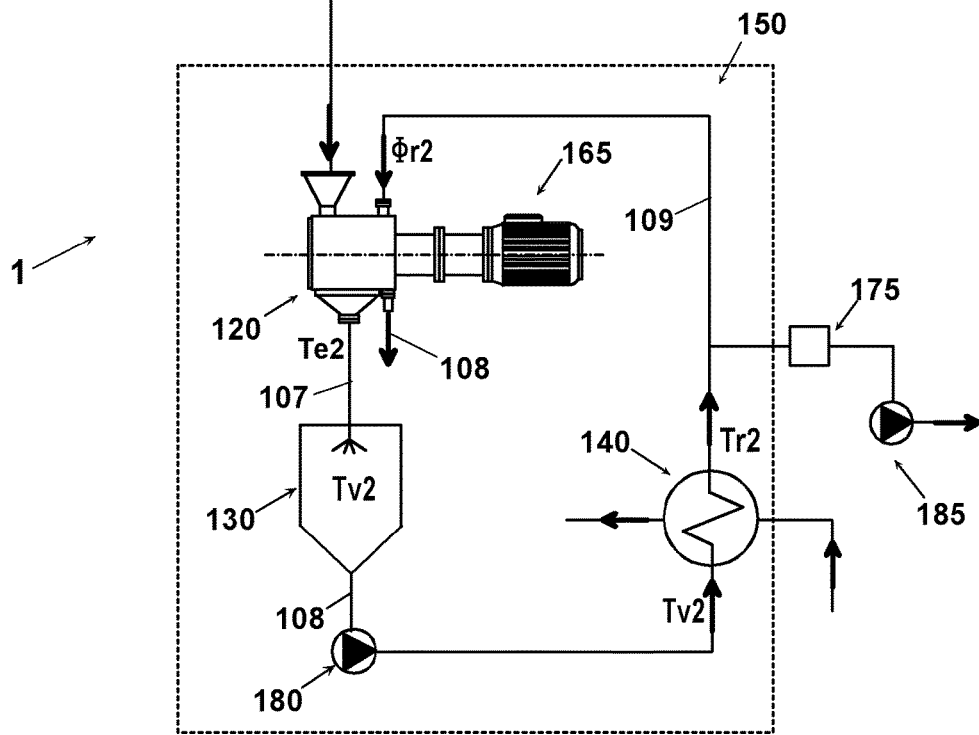

PLANT AND PROCESS FOR PRODUCING PUREE AND/OR JUICE STARTING FROM A FOOD PRODUCT OF VEGETABLE ORIGIN

FIELD OF THE INVENTION

The present invention relates to the food industry and in particular to a plant for producing puree and/or juice starting from a food product of vegetable origin.

Furthermore, the invention relates to the process for producing puree and/or juice obtained by the aforementioned plant.

Background of the Invention

As known, the industrial extraction of juice and puree from vegetable products, such as fruits and vegetables, is carried out by rotating machines, such as rough extractors and refiner extractors. These, normally, comprise a rotor provided with blades and mounted within a fixed, or movable sieve having cylindrical, or conical, shape, and provided with holes of determined size. The rotor is operatively connected to a driving group, which causes the same to rotate about a rotation axis. The centrifugal force produced by the blades of the rotor on the treated product forces the product same against the sieve causing the same to be divided in a main product, i.e. the juice, or the puree, which passes through the holes of the sieve and is discharged through a first outlet, and a waste product, mainly the seeds, the skins and the stones, which, instead, does not pass through the holes of the sieve and is discharged through a second outlet. See as an example U.S. Pat. No. 4,643,085.

A known process of this kind is the extraction at room temperature, also called "cold extraction", which is, normally, carried out in two steps. A first step of grinding and/or softening the food pulps, for example by a series of pulses in quick succession as for example described in EP0511174, and a second step carried out within the extractor where the aforementioned separation of the treated product in a main product, i.e. the juice and the puree, from the solid parts to be wasted. The puree extracted at room temperature is, then, heated, within a heating plant, in order to block the enzymatic activity and stabilizing the same, this process is known as enzymatic inactivation.

Another example of a process for producing puree, or juice and the related plant is described in WO2012/160483. In this case, downstream of the extraction machine and a deaerating device, a recirculation circuit is provided comprising a thermal treatment apparatus and a storage reservoir within which the extracted food product is caused to recirculate, in case is necessary to disconnect the extraction machine from the deaeration device, for example due to leakages in the ducts feeding the product, or problems to the extraction machine, or to the deaeration device. In this way, it is possible to stop the plant in order to work on the damaged, or obstructed, parts preventing any change of the sugars concentration of the extracted food product from the correct value and, therefore, avoiding to discharge as waste product the product that has been already extracted. Once that the correct working conditions have been restored, the recirculation circuit is by-passed.

A drawback of the prior art solutions is the difficulty to quickly heat, or cool, the product, in order to prevent deterioration of the same. In fact, inside of the heat exchangers that are normally used, the product transfers thermal energy to, or absorbs the same from, the exchange surfaces that are present inside the same, with which come into contact and, therefore, the heating, or the cooling cannot occur quickly. Therefore, in order to quickly heat, or cool, the entering product it is preferred to mix the same with a high quantity of food product, which is already hot.

A solution to the aforementioned technical problems is, for example, described in WO2012/028946, which provides to recirculate within the extraction machine a part of the product that has been heated into an enzymatic inactivation circuit. More precisely, the main product that is present within the extraction machine, once has been passed through the sieve, is hit by a flow of hot product coming from the enzymatic inactivation apparatus. The mixture so obtained in the extraction machine comprises at least a part of product enzymatically inactivated that is discharged through an outlet.

However, the product, in particular during the extraction step that is carried out within the extraction machine, can absorb a certain quantity of air and/or incondensable gases and/or humidity, which unavoidably reduce the efficiency of the heat exchange within the heating plant, thus, compromising the enzymatic inactivation process and, therefore, causing a premature deterioration of the product.

SUMMARY OF THE INVENTION

It is, therefore, an object of the present invention to provide a plant for producing puree, or juice, starting from a food product of vegetable origin that is able to overcome the aforementioned drawbacks of the prior art plants.

It is, in particular, an object of the present invention to provide a plant for producing puree, or juice, starting from a food product of vegetable origin which allows to increase the efficiency of the heat exchange within the apparatus for enzymatic inactivation and, therefore, to obtain a final product having the desired organoleptic properties.

It is also an object of the present invention to provide a process for producing puree, or juice, starting from a food product of vegetable origin having the same advantages.

These and other objects are achieved by a plant, according to the invention, for producing juice and/or puree starting from a food product of vegetable origin, said plant comprising:

an extraction machine comprising a rotor mounted within a sieve provided with a plurality of holes, said rotor being configured to rotate about a rotation axis to cause a starting food product at a temperature To to be divided in an extracted food product containing the juice and/or puree, which passes through said holes and is discharged through a first outlet, and a waste product, which, instead, does not pass through said holes and is discharged through a second outlet;

a heat exchange apparatus, positioned downstream of said extraction machine and configured to heat, or cool, the food product from an inlet temperature up to an outlet temperature, in order to obtain, respectively, a heated, or cooled, food product;

whose main characteristic is that a deaeration and/or concentration apparatus is, furthermore, provided configured to contain a predetermined quantity of said extracted food product, within said deaeration and/or concentration apparatus being maintained a predetermined temperature Tv and a predetermined vacuum degree, in such a way to deaerate and/or concentrate said extracted food product and that a recirculation circuit is, furthermore, provided comprising said extraction machine, said heat exchange apparatus, and said deaeration and/or concentration apparatus and configured to recirculate a predetermined quantity of heated, or cooled, and deaerated and/or concentrated food product into said extraction machine, said heated, or cooled, and deaerated and/or concentrated food product recirculated into said extraction machine being arranged to transfer a predetermined thermal power (Pt) to said extracted food product.

Other technical characteristics of the present invention and related embodiments are set out in the dependent claims.

In particular, the aforementioned deaeration and/or concentration apparatus is operatively connected to a device for generating a predetermined vacuum degree.

According to another aspect of the invention, a method for producing juice and/or puree starting from a food product of vegetable origin comprises the steps of:

extracting within an extraction machine a starting food product at a predetermined temperature T0 in order to obtain an extracted food product and a waste product, said extraction machine comprising a rotor mounted within a sieve provided with a plurality of holes, said rotor being configured to rotate about a rotation axis to cause the starting food product introduced through a first inlet to be divided in the aforementioned extracted food product containing the juice and/or puree, which passes through said holes and is discharged through a first outlet, and the aforementioned waste product, which, instead, does not pass through said holes and is discharged through a second outlet;

heating, or cooling, said extracted food product within a heat exchange apparatus, from an inlet temperature up to an outlet temperature, thus obtaining a heated, or cooled, food product;

deaerating and/or concentrating said extracted food product by maintaining a predetermined temperature Tv and a predetermined vacuum degree within a deaeration and/or concentration apparatus, which is arranged to contain a predetermined quantity of said extracted food product, said deaeration and/or concentration apparatus being operatively connected to a device for generating a predetermined vacuum degree;

recirculating a predetermined quantity of heated, or cooled, and deaerated and/or concentrated food product into said extraction machine, in such a way to exchange a predetermined thermal power (Pt) between said extracted food product and said recirculated food product in said extraction machine.

BRIEF DESCRIPTION OF THE DRAWINGS

The invention will be now illustrated with the following description of an exemplary embodiment thereof, exemplifying but not limitative, with reference to the attached drawings wherein.

Figure 1:
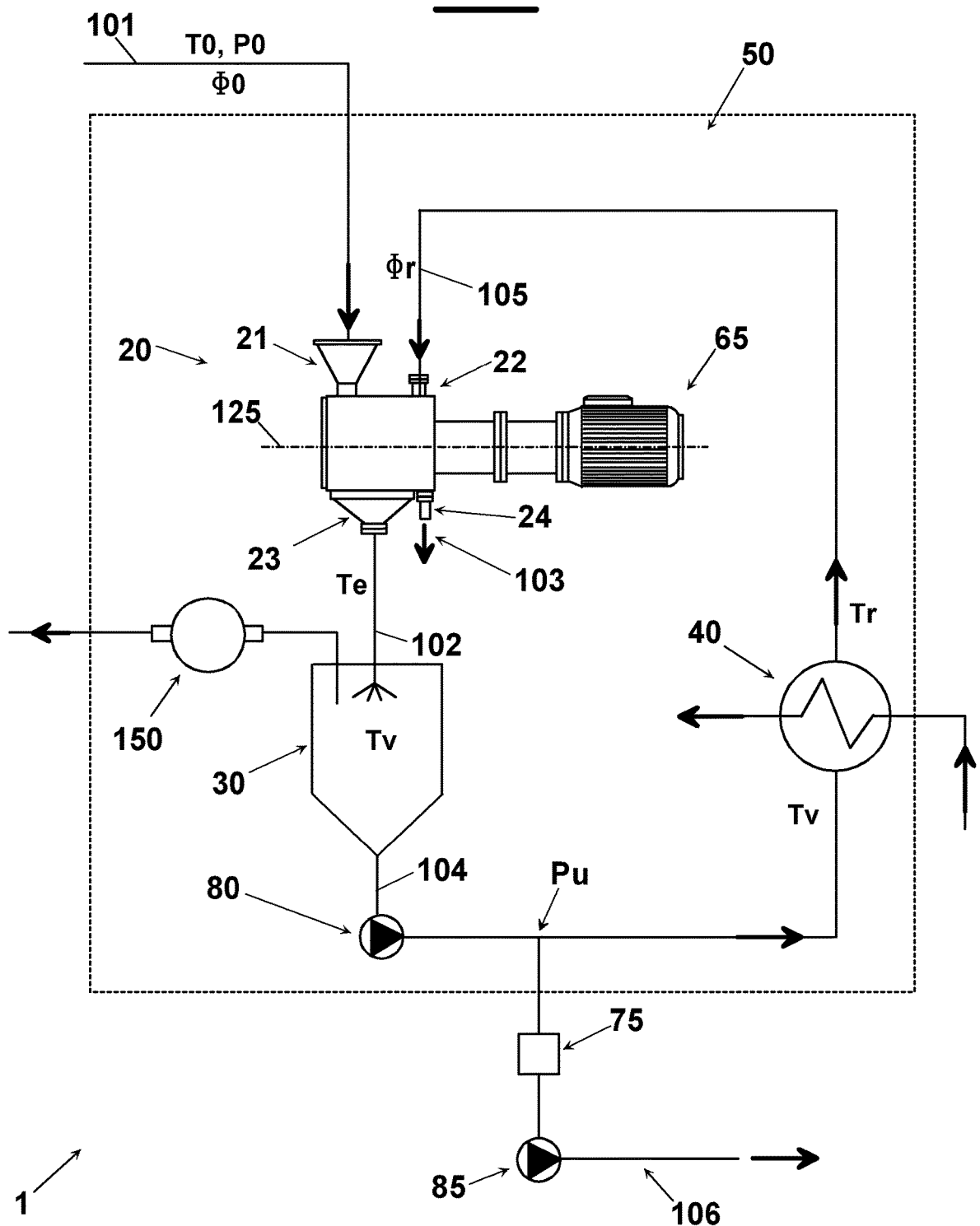
FIG. 1 diagrammatically shows a first embodiment of the plant, according to the invention, for producing puree, or juice, starting from a food product of vegetable origin.
Figure 8:
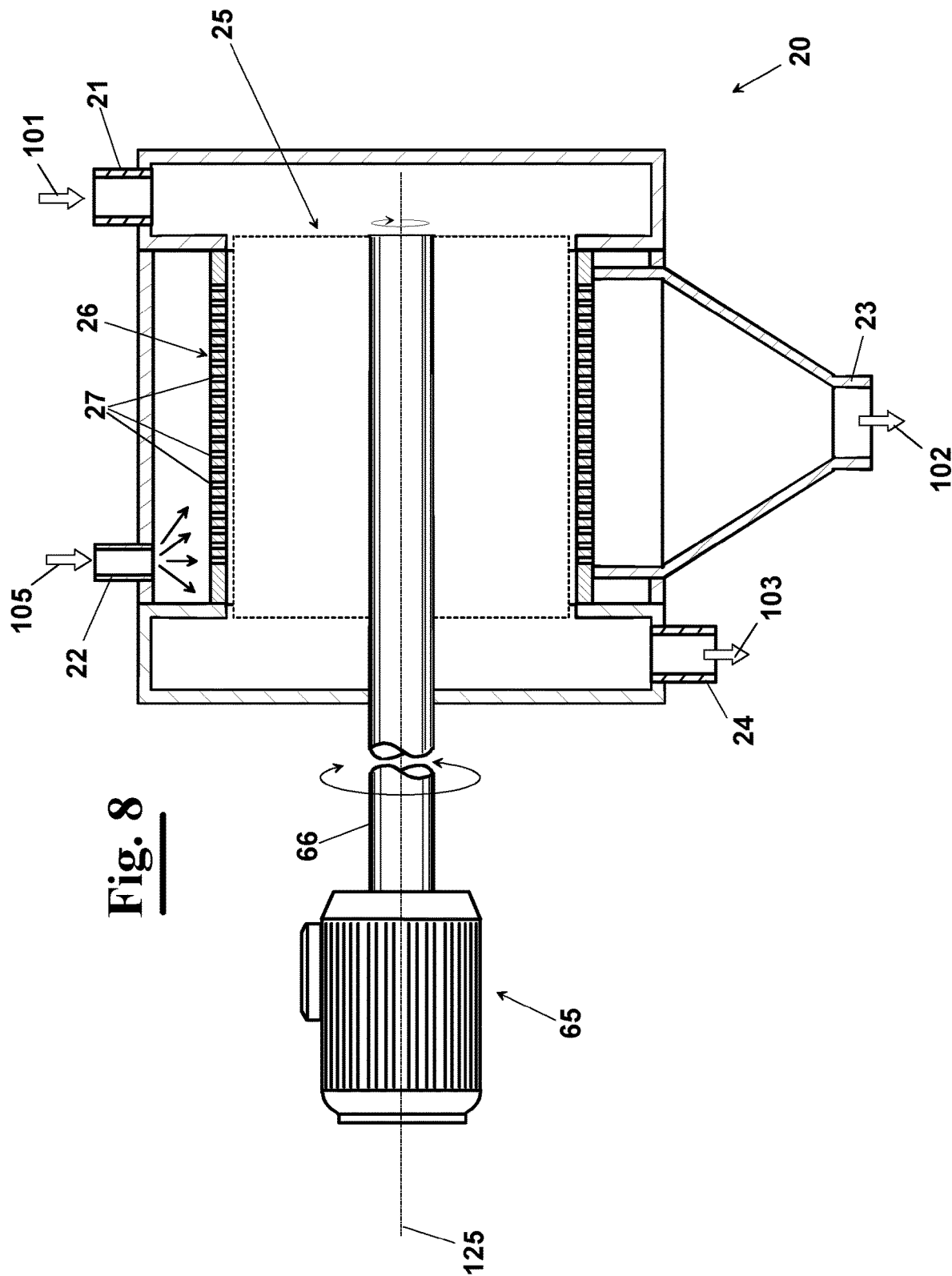

Figures from 2 to 7 diagrammatically show some alternative embodiments of the plant of FIG. 1 according to the invention;

FIG. 8 diagrammatically shows a longitudinal section view of an extraction machine according to the invention;

Figures from 9 to 11 diagrammatically show some further alternative embodiments of the plant of FIG. 1 according to the invention.

DETAILED DESCRIPTION OF SOME EXEMPLARY EMBODIMENTS OF THE INVENTION

As diagrammatically shown in FIG. 1, a plant 1, according to the invention, for producing juice and/or puree from a starting food product of vegetable origin 101, comprises an extraction machine 20 into which the starting food product 101 having a starting temperature T0, is fed to be subjected to an extraction step obtaining an extracted food product 102, in particular puree, or juice, and a waste product 103. The extracted food product 102 is discharged from the extraction machine 20 through a first outlet 23, and, then, heated, or cooled, within a heat exchange apparatus 40 positioned downstream of the extraction machine 20 and configured to heat, or cool, the food product that is present in the same from an inlet temperature up to an outlet temperature. For example, the heat exchange apparatus 40 can be configured to heat the food product. In particular, within the heat exchange apparatus 40 a thermal power Pt can be transferred to the extracted food product that is sufficient to cause an enzymatic inactivation, i.e. to bring the same to an outlet temperature greater than, or equal to, the temperature of enzymatic inactivation Tie of the product, with Tie>To and, however, set between 75° C. and 125° C.

Alternatively, the heat exchange apparatus 40 can be configured to cool the food product. In particular, the heat exchange apparatus 40 can be configured in such a way that, within the same, the food product is arranged to transfer heat, thus becoming cooler, up to a predetermined outlet temperature Tu, for example a temperature Tu set between about 5° C. and 20° C. In this case, the temperature Tv within the deaeration and/or concentration apparatus 30 will be less than the starting temperature To, i.e. Tv<To.

According to the present invention, furthermore, the plant 1 provides a deaeration and/or concentration apparatus 30 configured to contain a predetermined quantity of the aforementioned extracted food product. More precisely, within the deaeration and/or concentration apparatus 30 a predetermined temperature Tv and a predetermined vacuum degree, i.e. a predetermined pressure P2 less than the atmospheric pressure, are maintained, in such a way to deaerate and/or concentrate the extracted food product within the extraction machine 20.

The plant 1, furthermore, provides a recirculation circuit 50, which is diagrammatically indicated in figure with a block delimited by a broken line, comprising the extraction machine 20, the heat exchange apparatus 40 and the deaeration and/or concentration apparatus 30. More precisely, the recirculation circuit 50 is configured to recirculate a predetermined quantity of heated, or cooled, and deaerated and/or concentrated food product, into the extraction machine 20. More in detail, the heated, or cooled, and deaerated and/or concentrated food product that is recirculated into the extraction machine 20 is arranged to transfer, or to absorb, a predetermined thermal power Pt to the extracted food product 102. In particular, according to an embodiment of the invention, in the case in which the heat exchange apparatus 40 is configured to heat the food product, the thermal power Pt which is transferred to the extracted food product can be such to preheat the extracted food product, i.e. puree and/or juice, before the same is discharged from the extraction machine 20. In this case, furthermore, the temperature Tv of the deaeration and/or concentration apparatus is greater than the temperature T0, i.e. Tv>T0.

In an alternative embodiment of the invention, instead, ma comprising, as in the previous case, the heat exchange apparatus 40 configured to heat the food product, the thermal power Pt transferred from the heated and deaerated and/or concentrated food product to the extracted food product such to cause an enzymatic inactivation of at least a part of the aforementioned extracted main product before that the same is discharged from the extraction machine 20. Also in this case, as in the previous case, the temperature Tv of the deaeration and/or concentration apparatus is greater than the temperature T0, i.e. Tv>T0.

The plant 1, furthermore, provides an outlet point Pu, at which a "T" connection element can be provided to cause a flow of product to exit the recirculation circuit 50. More precisely, at point Pu a predetermined quantity of extracted food product, in particular a heated deaerated and/or concentrated extracted food product 106, can exit the recirculation circuit 50, for example pushed by a pump 85, or owing to the internal pressure of the line of the plant 1. In particular, the outlet point Pu can be positioned upstream of the heat exchange apparatus (FIGS. 1, 2 and 4), or downstream of the same (FIG. 3). More in particular, between the outlet point Pu and the pump 85, if present, a valve 75, for example a two ways valve, can be, advantageously, provided.

In particular, the aforementioned thermal power Pt can be adjusted by preliminary setting, or adjusting, the quantity and/or the temperature of the heated and deaerated and/or concentrated food product, which is recirculated into the extraction machine 20.

As shown in detail in FIG. 8, according to a preferred embodiment, within the extraction machine 20 a rotor 25 is mounted that is arranged to operate in combination with a fixed, or movable, sieve 26, in particular mounted in such a way to rotate about a rotation axis, that is provided with a plurality of holes 27 to divide the starting product 101 in the main product 102 and the waste product 103. More precisely, the rotor 25 is moved by a driving group 65 in such a way to cause the same to rotate about a rotation axis 125. More precisely, the rotor 25 is arranged to force the starting food product 101 against the sieve 26 causing the same to be divided in the extracted food product, which passes through the holes 27 and is discharged from the machine through a first outlet 23, and the waste product 103, which, instead, does not pass through the holes 27 of the sieve and is discharged through a second outlet 24. Furthermore, according to the present invention, the extraction machine 20 has a second inlet 22 through which a predetermined quantity of heated and deaerated and/or concentrated product 105 can be introduced into the extraction machine 20, in particular externally to the sieve 26.

Figure 2:
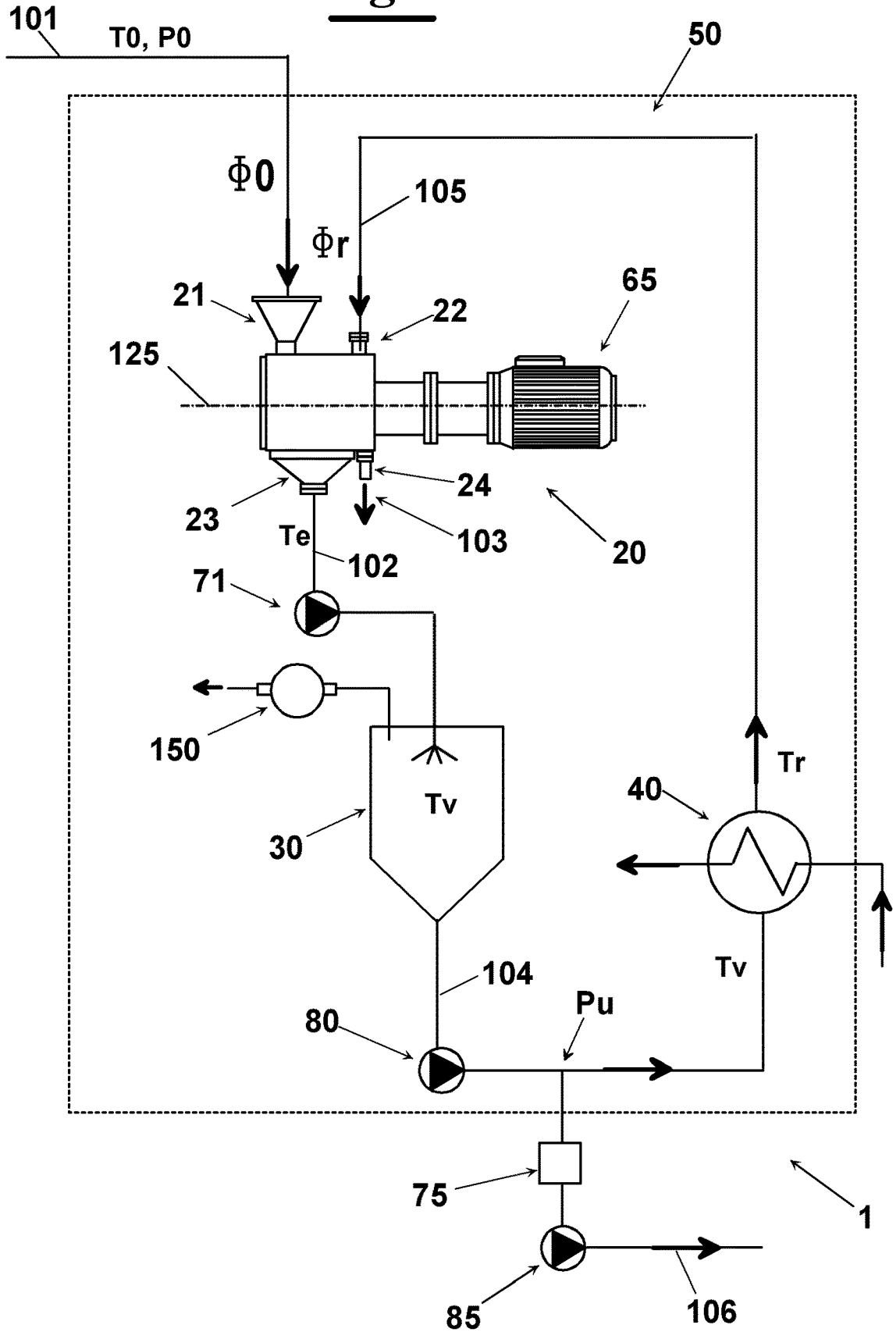
Figure 3:
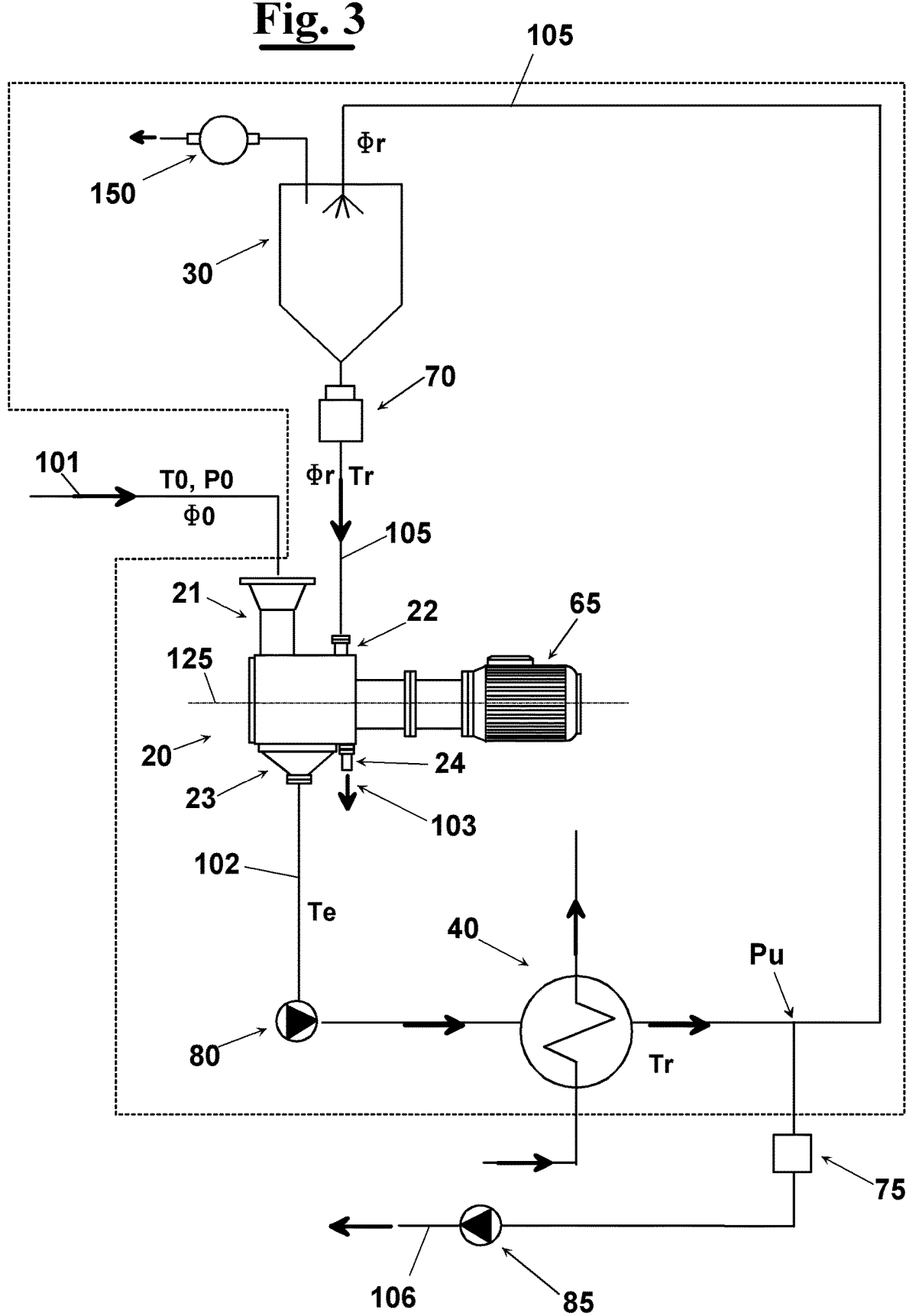

As diagrammatically shown in the FIGS. 1 and 2, in a possible embodiment of the invention, the deaeration and/or concentration apparatus 30 can be positioned downstream of the extraction machine 20 and upstream of the heat exchange apparatus 40.

Inside of the deaeration apparatus 10 a deaeration chamber 15 is positioned within which the extracted food product 100 is fed. The extracted food product 102 can be fed into the deaeration and/or concentration apparatus 30 directly from an extraction machine 20 maintaining a determined pressure inside the feeding duct. In particular, in order to prevent the formation of air bubbles and air sucking, the ducts of the plant are provided full of food product. In particular the deaeration and/or concentration apparatus 30 is provided to be pneumatically connected with a device 150 for generating a predetermined vacuum degree, for example a vacuum pump. In particular, adjustment devices, not shown in the figure, can be provided configured to detect instant by instant the vacuum degree that is present in the deaeration and/or concentration apparatus 30 and to adjust the device 150.

Figure 4:
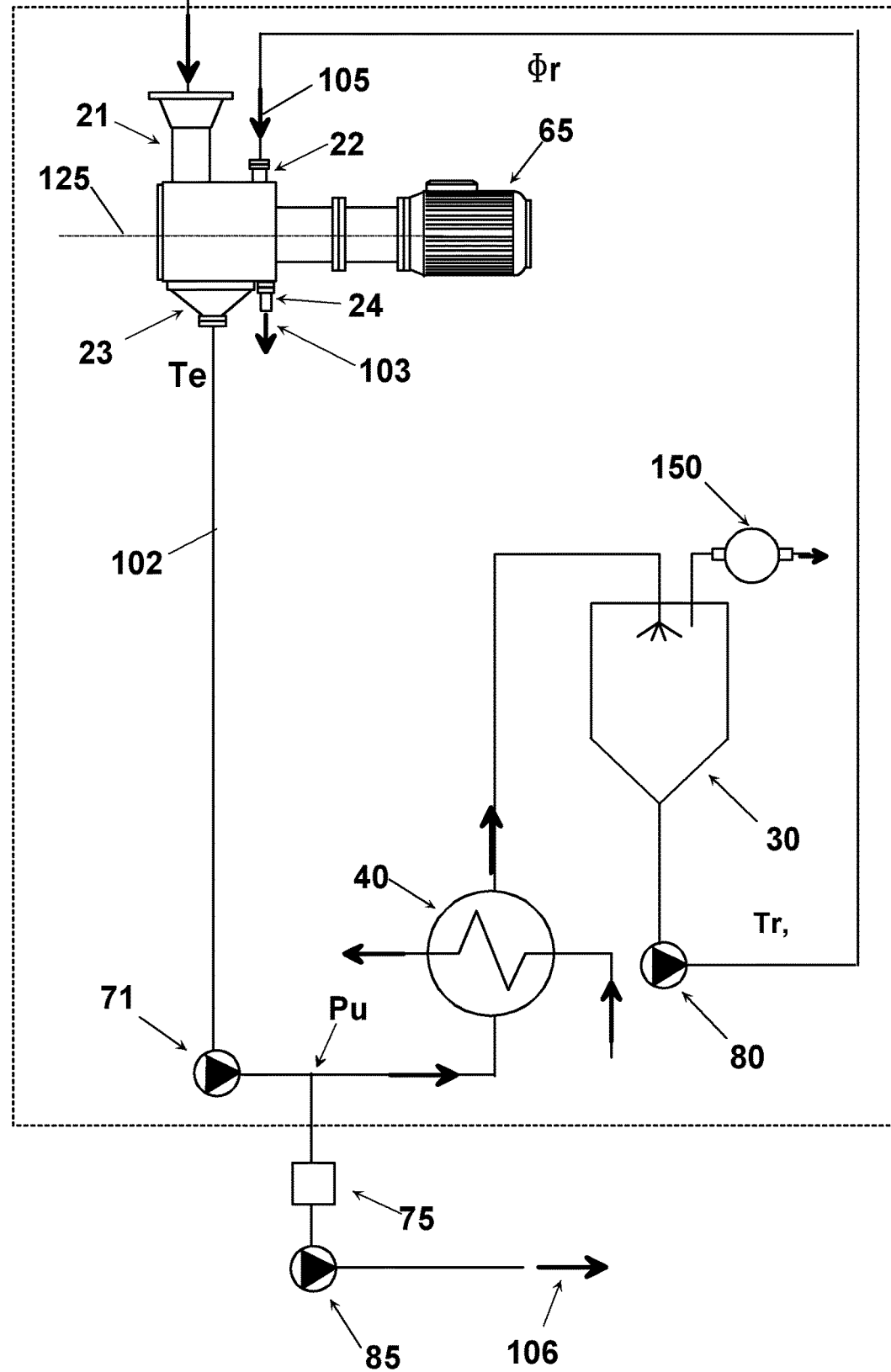

As shown in the alternative embodiments of FIGS. 3 and 4, the possibility is, anyway, provided that the deaeration and/or concentration apparatus 30 can be positioned downstream of the heat exchange apparatus 40 and upstream of the extraction machine 20.

In both the cases, however, that means both in the case shown in FIG. 1 and in the case shown in FIG. 2, the recirculation circuit 50 is arranged to recirculate into the extraction machine 20 a predetermined quantity of extracted food product heated and deaerated and/or concentrated. In particular, the present invention allows to optimize the process for producing puree and/or juice, because it reduces, up to zero, the same, the quantity of air, humidity, and incondensable gases, that are present within the product during the different steps of the process. For the same reasons, the present invention allows to obtain a final product having a very high quality.

In a possible embodiment of the invention that is diagrammatically shown in FIG. 1, the extraction machine 20 is positioned at a height H1 from the floor of the room where is installed, greater than the height H2 at which the deaeration and/or concentration apparatus 30 is positioned. Therefore, the possibility can be provided that the extracted food product 102 is arranged to pass from the extraction machine 20 to the deaeration and/or concentration apparatus 30 by gravity, i.e. without using pumping devices.

In this case, along the feeding line of the extracted food product 102 from the extraction machine 20 to the deaeration and/or concentration apparatus 30, a valve, preferably a modulating valve, which is not shown in the figure for reasons of simplicity, can be provided.

In the alternative embodiment of FIG. 2, the extracted food product 102 is, instead, discharged from the extraction machine 20 and fed into the deaeration and/or concentration apparatus 30 by a pumping device 80. The plant 1 can also provide at least a pumping device 80 for transferring the deaerated and/or concentrated product from the deaeration and/or concentration apparatus 30 to the heat exchange apparatus 40. The present invention allows, instead, to avoid the use of another pumping device to transfer the heated and deaerated and/or concentrated product 105 from the heat exchange apparatus to the extraction machine 20. Analogously to the previous case, if the deaeration and/or concentration apparatus 30 is positioned upstream of then extraction machine 20 (FIGS. 3 and 4), the deaeration and/or concentration apparatus 30 same can be positioned at a height H1' from the floor of the room where is installed that is greater than the height H2' at which the extraction machine 20 is positioned. Also, in this case, the heated and deaerated and/or concentrated extracted food product 105 can be arranged to move from the deaeration and/or concentration apparatus 30 to the extraction machine 20 by gravity (FIG. 3), or, analogously to what has been described above with reference to the embodiment of FIG. 2, the transfer of the heated deaerated and/or concentrated extracted food product 105 from the deaeration and/or concentration apparatus 30 to the extraction machine 20 can be carried out by a pumping device 80 (FIG. 4). Advantageously, in the case of FIG. 3, along the feeding line of the heated deaerated and/or concentrated extracted food product 105 from the deaeration and/or concentration apparatus 30 to the extraction machine 20 by gravity, a valve, preferably a modulating valve, can be provided 70.

Figure 5:
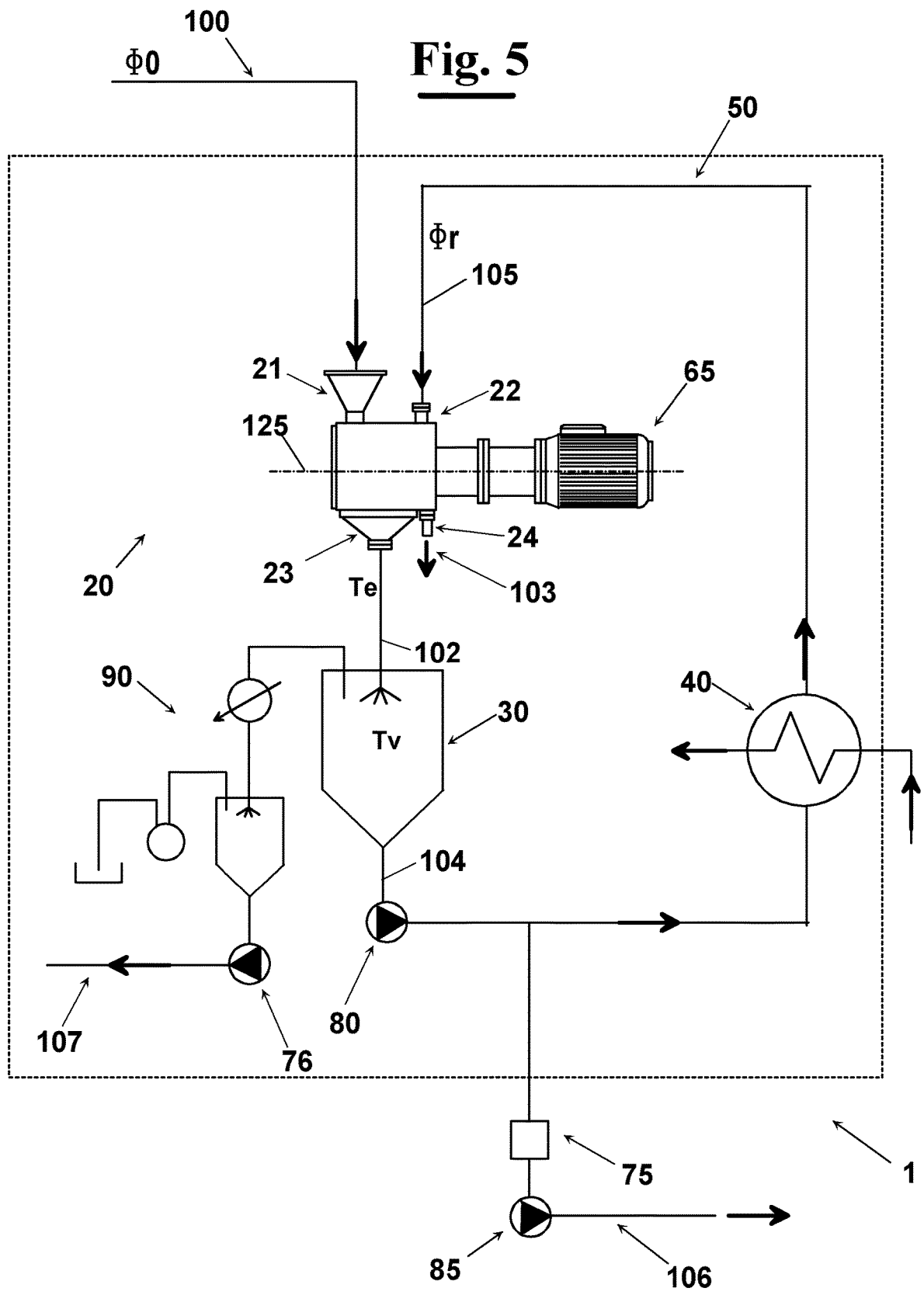

According to the alternative embodiment of FIG. 5 the deaeration and/or concentration apparatus 30 is configured to remove a predetermined quantity of steam, and incondensable gases, if present, from the extracted food product 102 contained in the same. In this case, the steam 107 that is removed from the extracted food product 102 and discharged from the deaeration and/or concentration apparatus 30 can be, advantageously, condensed by a condensation group 90 before being discharged from plant 1, for example by a pump 86. The embodiment of the invention which provides to concentrate the extracted food product 102 within the recirculation circuit 50, according to the invention, besides the aforementioned advantages to optimize the heat exchange within the heat exchange apparatus 40 and avoiding, therefore, this way that the product can deteriorate during the production process, allows also to adjust the concentration level of the final product 106.

Figure 6:
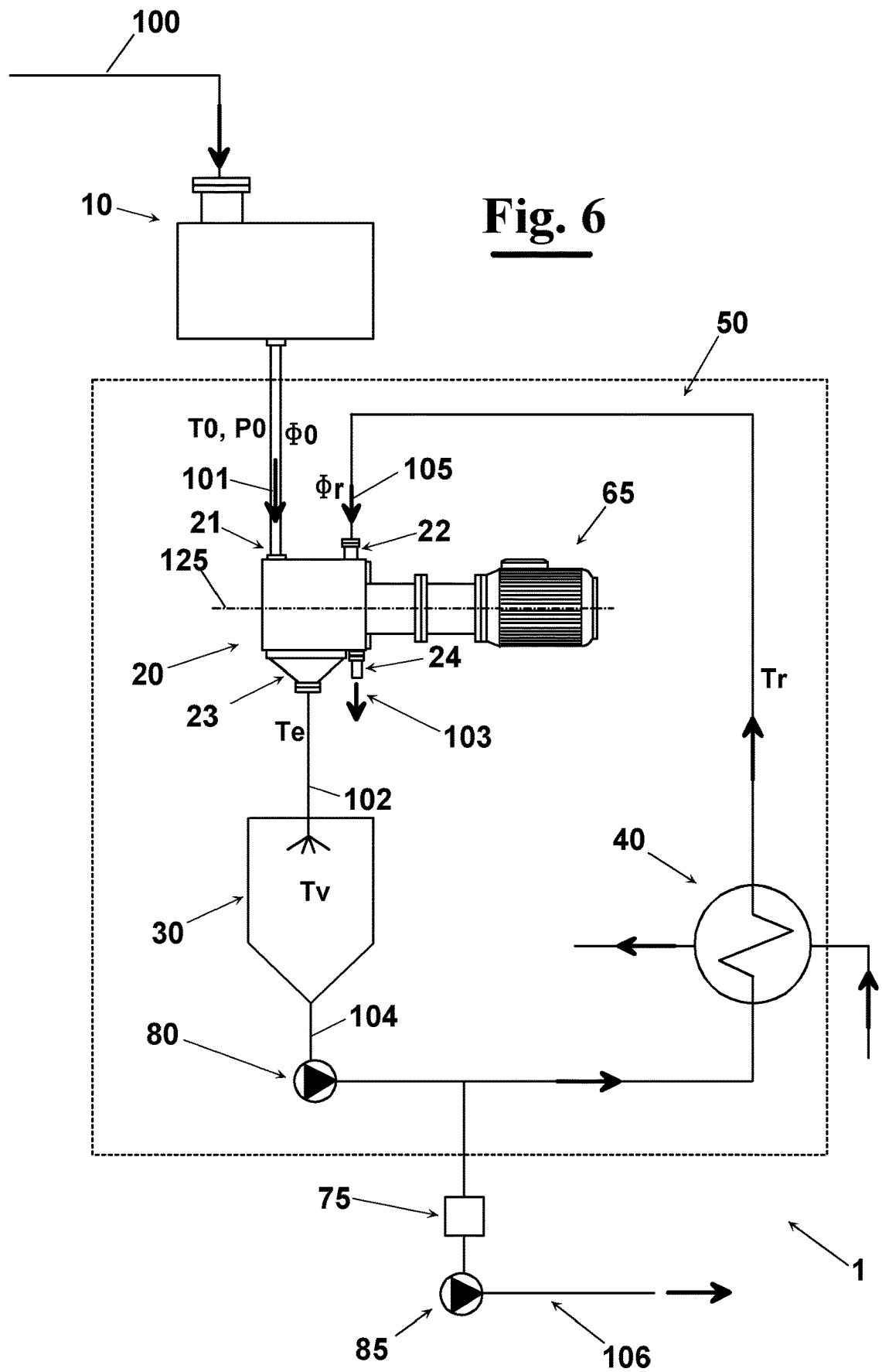

According to another alternative embodiment of the invention that is diagrammatically shown in FIG. 6, upstream of the extraction machine 20 a preliminary treatment machine 10 can be provided configured to subject a food product of vegetable origin 100 to a predetermined treatment before being fed to an extraction machine 20. In particular, the preliminary treatment machine 10 can be a softening machine arranged to soft the food product 100 by a series of pulses in quick succession obtaining a softened product as for example described in EP0511174. In an alternative embodiment of the invention, the preliminary treatment machine 10 can be a division machine arranged to divide the starting product in pieces of predetermined size, for example in a range set between 5 mm and 200 mm, advantageously in a range set between 20 mm and 180 mm. Alternatively, the preliminary treatment machine 10 can be a chopping machine arranged to chop the entering vegetable food product. According to still another alternative embodiment of the present invention the preliminary treatment machine 10 can be configured to cause the starting food product of vegetable origin to pass through a sieve, for example a preliminary extraction machine.

Figure 7:
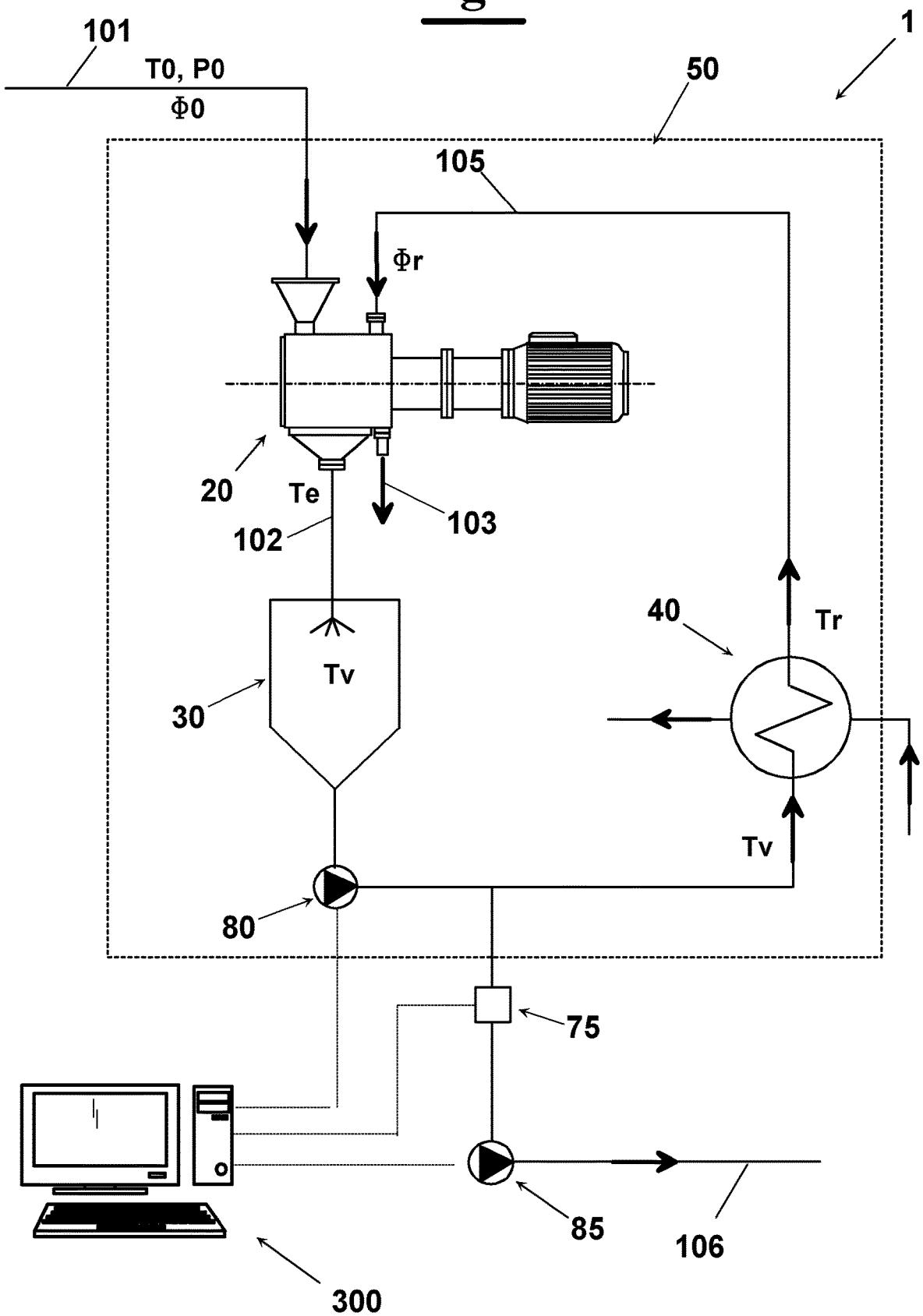

As diagrammatically shown in FIG. 7, the plant 1 can, furthermore, provide a control unit 300 operatively connected with at least a part of the pumping devices 80 and 85, and with the valves 70 and 75 provided in the plant. In particular, the control unit 300 is configured in such a way to detect the different data of the pumping devices 80, 85 and of the different valves 70, and 75 positioned in the plant 1 and to adjust the flow between the diverse apparatuses 20, 30, 40, in such a way to provide to the extracted food product 102 a predetermined value of thermal power Pt by the heated, deaerated and/or concentrated product 105*m*, which is recirculated into the extraction machine 20.

In particular, the control unit 300 can be configured to adjust the flow φr of heated, deaerated and/or concentrated product recirculated in the extraction machine 20, for example by controlling the flow supplied by one, or more pumps 80 of plant 1. More in particular, depending on the kind of treated product, the control unit 300 is arranged to set the flow of recirculated food product φr in such a way that the ratio R between the flow φr of recirculated food product same and the flow φ0 of product that is fed into the extraction machine 20 is set between 0.5 and 6, or between 6 and 50. Advantageously, the control unit 300 is arranged to set the flow of recirculated food product φr in such a way that the aforementioned ratio R is set between 6 and 10, preferably between 10 and 50.

Alternatively, it is possible to preliminarily set the aforementioned flow of recirculated food product φr in such a way that the ratio R between the flow of recirculated food product φr same and the flow φ0 of food that is fed into an extraction machine 20 is set between 0.5 and 6, or between 6 and 50. Advantageously, the aforementioned flows φr and φ0 can be preliminarily set in such a way that the ratio R of the same is set between 6 and 10, preferably between 10 and 50.

According to the present invention, the plant 1 diagrammatically shown in the figures from 1 to 7 can operate in different working configurations and starting from products with different starting temperatures.

In particular, in a first working configuration, the product 100, or 101, can be fed into plant 1 at a temperature T0 set between 0° C. and 40° C. and both the extraction and the deaerating and/or concentrating steps can be carried out a freddo. The temperature Te of the extracted food product exiting the extraction machine 20 will be, in this case, less than 40° C. In this case the temperature Tv inside of the deaeration and/or concentration apparatus 30 will be, furthermore, equal to the temperature Te. The temperature Tr of the recirculated food product 105 can be, in this case, set between the aforementioned starting temperature To and 70° C.

The value of ratio R between the flow of recirculating and the flow entering the extraction machine 20 can be, advantageously, set between 0.5 and 6.

According to a second working configuration, instead, the product 100, or 101, is fed to the plant 1 at a temperature T0 set between −22° C. and 0° C. In this case, the temperature Te of the extracted food product 102 can be set between the temperature T0 and 40° C. The temperature within the deaeration and/or concentration apparatus 30 will be in this case equal to the temperature Te of the extracted food product 102. The temperature Tr of the recirculated food product 105 can be, also in this case, set between the aforementioned starting temperature To and 70° C. The value of ratio R between the flow of recirculating and the flow entering the extraction machine can be, advantageously, set between 0.5 and 6, analogously to the first working configuration.

In a further working configuration, as in the previous case, the product 100, or 101, is also in this case fed to plant 1 at a temperature T0 set between −22° C. and 0° C. However, in this case, the temperature Te of the extracted food product 102 can be higher than the temperature Tv within the deaeration and/or concentration apparatus 30. More in particular, the temperature Tv will be, in this case, set between 40° C. and the extraction temperature Te of the extracted food product 102. The temperature Tr of the recirculated food product 105 can be, in this case, set between the aforementioned starting temperature To and 80° C. The value of ratio R between the flow of recirculating and the flow entering the extraction machine 20 can be advantageously set between 6 and 50.

In still a further working configuration according to the invention, the product 100, or 101, can be fed to the plant 1 at a temperature To set between −22° C. and 40° C. In this case, the temperature Te of the extracted food product 102 can be advantageously higher than 40° C., and the temperature Tv within the deaeration and/or concentration apparatus 30 can be less than the aforementioned temperature Te of the extracted food product 102. The temperature Tr of the recirculated food product 105 can be, in this case, set between the temperature of enzymatic inactivation Tin, i.e. set between 75° C. and 90° C. and 125° C., temperatures beyond which the organoleptic properties of the product can change in an undesirable way. In this case the value of ratio R between the flow of recirculating and the flow entering the extraction machine 20 can be advantageously set between 6 and 10, or between 10 and 50.

More in particular, the product 101 entering the extraction machine 20 has a temperature T0 set between −22° C. and 40° C. Therefore, according as it is desired to pre-heat, or enzymatically inactivate, the product within the extraction machine 20, or concentrate the same within the deaeration and/or concentration apparatus 30, it is preliminarily set, or adjusted by the control unit 300, the flow of recirculated food product in such a way to adjust the thermal power Pt associated to the same.

In particular, if it is desired to heat the product within the extraction machine 20, without causing the same to be enzymatically inactivated, the flow φr of recirculated food product is adjusted, or preliminarily set, in such a way that the ratio R between the flow φr of recirculated food product and the flow φ0 of product that is fed in the extraction machine 20 is set between 0.5 and 6. In this way, the flow of product 102 entering the extraction machine 20 can, advantageously, have a temperature Te set between 5 and 10° C.

Instead, if an enzymatic inactivation of the product that is present within the extraction machine 20 is desired, the flow φr of recirculated food product is adjusted, or preliminarily set, in such a way that the ratio R between the flow φr of recirculated food product and the flow φ0 of product that is fed into the extraction machine 20 is set between 6 and 10.

In the end, if it is desired to evaporate the product that is present within the deaeration and/or concentration apparatus 30, the flow φr of recirculated food product is advantageously set, or adjusted, in such a way to have a ratio R set between 10 and 50. Therefore, in this case, within the extraction machine 20 the enzymatic inactivation of the product is carried out.

Figure 9:
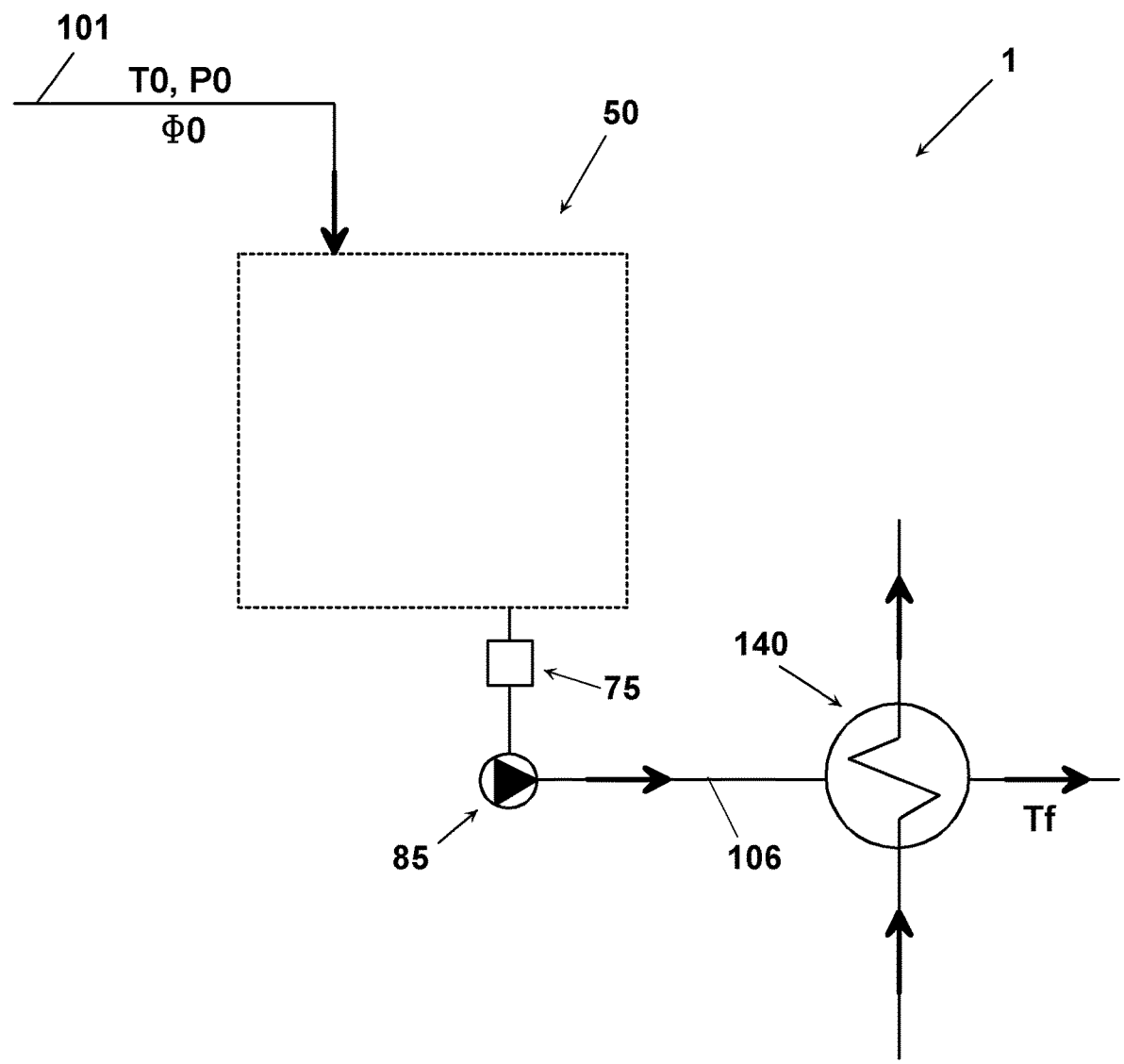

Further alternative embodiments of the present invention are shown in the figures from 9 to 11. In particular, according to the embodiment diagrammatically shown in FIG. 9 the product 106 is discharged from the plant 1 by a pump 85 from any one of the recirculating circuits 50 shown in the figures from 1 to 7, is transferred into an additional heat exchange apparatus 140, for example a heat exchanger, configured to heat, or cool, the same up to a temperature Tf. For example, the additional heat exchange apparatus 140 is configured in such a way to heat, or cool, the flow of product 106 up to reach the aforementioned temperature Tf, for example set between 2° and 50° C., by a flow of a heating, or cooling, fluid for example by a flow of water, before discharging the flow of product 106 from plant 1.

Figure 10:
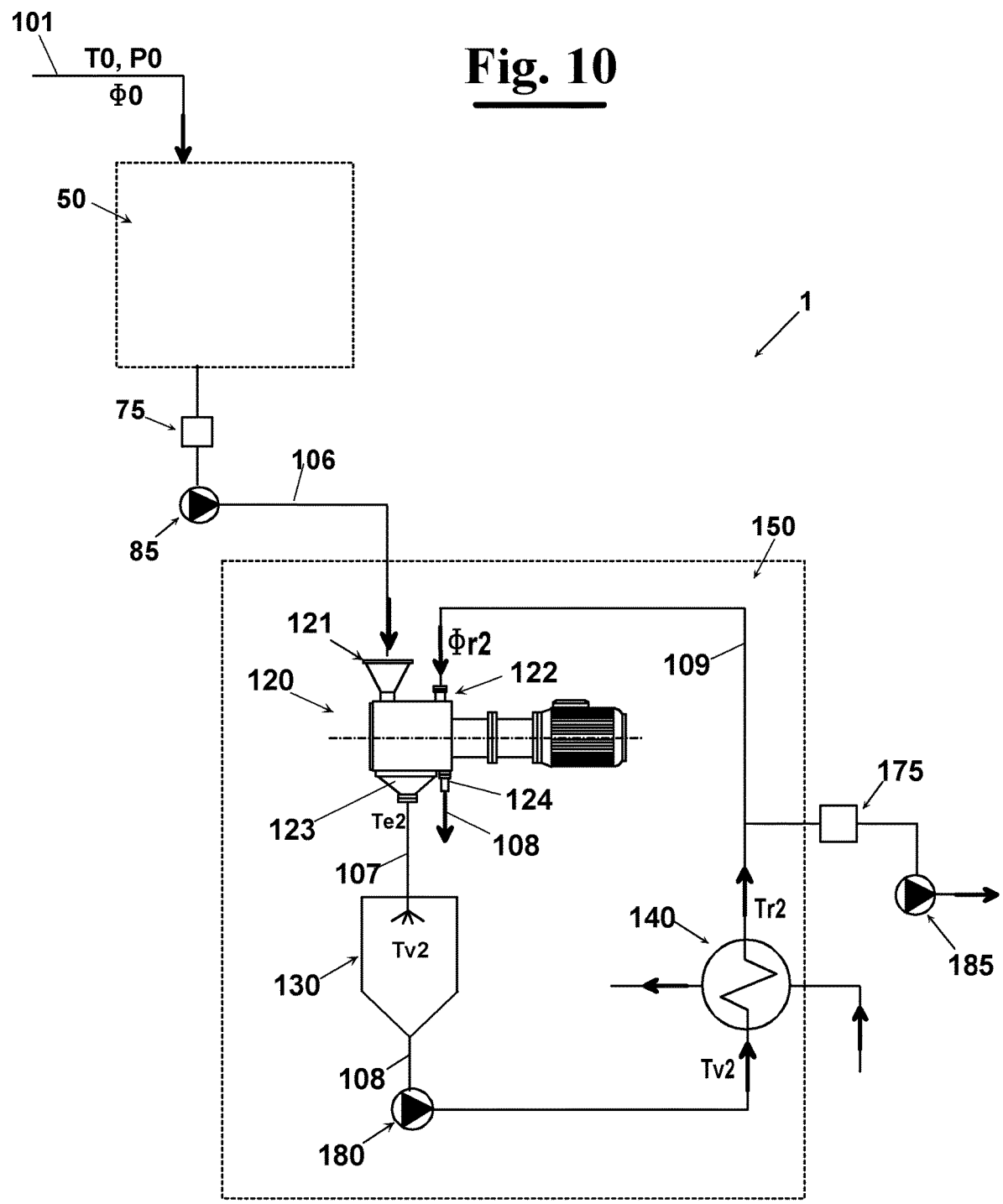

As diagrammatically shown in FIG. 10, according to an alternative embodiment of plant 1, besides the aforementioned recirculation circuit 50, an additional recirculation circuit 150 can be provided, to which the flow of product 106 exiting the recirculation circuit 50, can be transferred at an outlet point Pu positioned upstream, or downstream, of the heat exchanger 40, for example by the aforementioned pump 85, to be extracted and/or cooled. More in particular, according to the embodiment of FIG. 10, the flow of product 106 at temperature Tv, can be fed within an additional extraction machine 120, in particular a refiner extractor, configured analogously to the extraction machine 20 described above. More in particular, the additional extraction machine 120 provides a rotor and a sieve configured in such a way to operate in combination with each other to divide the product 106 that is fed through a first outlet 121 in a less dense fraction 107, which passes through the holes of a second sieve and is discharged through a first outlet 123, and in a more dense fraction 108, which, instead, does not pass through the holes of the sieve and is, then, discharged through a second outlet 124. Downstream of the additional extraction machine 120 an additional deaeration apparatus 130 can be provided. The deaerated product can be, then, discharged from plant 1 by a pump 180 to be sent to the additional heat exchange apparatus 140, which, analogously to the case of FIG. 9, can be configured to heat, or cool, the deaerated product 108 from a temperature Tv2 up to a temperature Tr2, for example set between 2° and 50° C.

The cooled product 109 can be, then, recirculated into the additional extraction machine 120, into which is introduced through a second inlet 122. In this way the cooled product 109 is mixed with the product exiting the sieve heating, or cooling the same. Therefore, the extracted product is heated, or cooled, before discharging the same from the additional extraction machine 120 through the outlet 123.

The flow of product 109 that is recirculated into the additional extraction machine 120 has a temperature Tr2, which, in the case that the additional heat exchange apparatus 140 is configured to cool the food product, is less than the temperature of the product 106 entering the same, i.e. Tr2<Tv and of the temperature of the extracted food product 107, i.e. Tr2<Te2. Therefore, in this case, due to the mixing of the flow 106 with the flow 109 carried out within the additional extraction machine 120, the flow of entering product 106 transfers heat to the flow of product 109, which, therefore, is heated. Also in this case, downstream, or upstream of the additional heat exchange apparatus 140, an outlet point Pu is, advantageously, provided at which a predetermined flow of product is discharged from plant 1. The discharge of the product from plant 1 can be obtained, for example, by a pump 185, or as above described for the case of the recirculation circuit 50, simply owing to the internal pressure of the line of plant 1.

Furthermore, still as provided for the recirculation circuit 50, also in the case of the additional recirculation circuit 150, the pumps 180 and 185 as well as valves 175 if they are present can be adjusted by a control unit 300, not shown in the figure for reasons of simplicity, but anyway of the kind that has been described above and shown in FIG. 7. Even though, in FIG. 10 an additional recirculation circuit 150 is shown in which the additional extraction machine 120 is arranged upstream of the additional deaeration apparatus 130 and wherein the additional heat exchange apparatus 140 is positioned downstream of the same, different solutions are also provided, in which the relative position of the machines is different.

At last, according to another aspect of the invention, the embodiment diagrammatically shown in FIG. 11 can be also provided. In this case, the only recirculation circuit 150 that is present is arranged to recirculate the extracted and deaerated and/or concentrated product 106. In practice, in this case, differently from the solutions described above, after that the product has been enzymatically inactivated within the heat exchange apparatus 40, it is not introduced into the extraction machine 20, but discharged from plant 1, and, therefore, is not recirculated. Instead, the product 106 is, advantageously, fed into the recirculation circuit 150 that is shown in FIG. 10 and described above.

At last, according to a further aspect of the invention, the possibility is provided that the recirculation circuit 50, or the additional recirculation circuit 150, can comprise an extraction machine 20, or 120, and a deaeration and/or concentration apparatus 30, or 130, but not a heat exchange apparatus.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A plant for producing juice and/or puree starting from a food product of vegetable origin, said plant comprising:
    an extraction machine including a rotor mounted within a sieve provided with a plurality of holes, said rotor being configured to rotate about a rotation axis to cause a starting food product at a temperature T0 introduced through a first inlet to be divided in:
        an extracted food product containing the juices and/or puree, which passes through said holes and is discharged through a first outlet, and
        a waste product which, instead, does not pass through said holes and is discharged through a second outlet;
    a heat exchange apparatus positioned downstream of said extraction machine and configured to heat, or cool, said food product from an inlet temperature up to a predetermined outlet temperature thus obtaining, respectively, a heated, or cooled, food product;
    a deaeration and/or concentration apparatus that is operatively connected to a device for generating a predetermined vacuum degree, said deaeration and/or concentration apparatus being configured to contain a predetermined quantity of said extracted food product and to maintain said predetermined quantity of said extracted food product at a temperature Tv and at a predetermined vacuum degree, in such a way to deaerate and/or concentrate said extracted food product; and
    a recirculation circuit that is configured to recirculate a predetermined quantity of heated, or cooled, and deaerated and/or concentrated food product into said extraction machine, said heated, or cooled, and deaerated and/or concentrated food product recirculated into said extraction machine being arranged to exchange a predetermined thermal power with said extracted food product.

2. The plant according to claim 1, wherein said deaeration and/or concentration apparatus is positioned downstream of said extraction machine and upstream of said heat exchange apparatus.

3. The plant according to claim 1, wherein said deaeration and/or concentration apparatus is positioned upstream of said extraction machine and downstream of said heat exchange apparatus.

4. The plant according to claim 1, further comprising a second inlet through which said extracted heated, or cooled, and deaerated and/or concentrated food product is arranged to be introduced into said extraction machine externally to said sieve.

5. The plant according to claim 2, wherein:
    said extraction machine is positioned at a height H1 greater than the height H2 at which said deaeration and/or concentration apparatus is positioned, and
    said extracted food product is arranged to move from said extraction machine to said deaeration and/or concentration apparatus by gravity.

6. The plant according to claim 3, wherein:
    said deaeration and/or concentration apparatus is positioned at a height H1 greater than the height H2 at which said extraction machine is positioned, and
    said heated, or cooled, and deaerated and/or concentrated food product is arranged to move from said deaeration and/or concentration apparatus to said extraction machine by gravity.

7. The plant according to claim 1, wherein:
    said heat exchange apparatus is configured to heat said food product, and
    the ratio R between the flow $\phi r$ of heated and deaerated and/or concentrated product that is recirculated in said extraction machine and the flow $\phi 0$ of product entering said extraction machine is set between 0.5 and 6.

8. The plant according to claim 1, wherein:
    said heat exchange apparatus is configured to heat said food product, and
    the ratio R between the flow $\phi r$ of heated and deaerated and/or concentrated product that is recirculated into said extraction machine and the flow $\phi 0$ of product entering said extraction machine is set between 6 and 50.

9. The plant according to claim 1, wherein:
    said heat exchange apparatus is configured to heat said food product, and
    the ratio R between the flow $\phi r$ of heated and deaerated and/or concentrated product that is recirculated into said extraction machine and the flow of product entering said extraction machine is set between 6 and 10.

10. The plant according to claim 1, wherein:
    said heat exchange apparatus is configured to heat said food product, and
    the ratio R between the flow $\phi r$ of heated, or cooled, and deaerated and/or concentrated food product that is recirculated into said extraction machine and the flow of starting food product entering said extraction machine is set between 10 and 50.

11. The plant according to claim 1, further comprising:
    a pumping device and a valve for moving said food product; and
    a control unit that is operatively connected with said pumping device and with said valve, said control unit being configured to adjust the flow between said extraction machine, said deaeration and/or concentration apparatus, and said heat exchange apparatus, in such a way to provide a predetermined value of thermal power to said extracted food product from said heated, cooled, deaerated and/or concentrated product that is recirculated into said extraction machine.

12. The plant according to claim 1, further comprising:
    within said recirculation circuit, an outlet point, at which a predetermined flow of said extracted food product, deaerated and/or concentrated, or said extracted food product, deaerated and/or concentrated and heated, or cooled, is arranged to be discharged from the plant, wherein:
        downstream of said outlet point, said flow of said exiting product is arranged to be transferred to an additional heat exchange apparatus configured in such a way to cool said exiting product up to a predetermined temperature Tf.

13. The plant according to claim 1, wherein:
    said heat exchange apparatus is configured to heat said food product, and
    within said recirculation circuit an outlet point is provided at which a predetermined flow of said extracted food product, deaerated and/or concentrated, or said extracted, deaerated and/or concentrated and heated food product, is arranged to be discharged.

14. The plant according to claim 13, wherein downstream of said outlet point, said predetermined flow of said exiting product is arranged to be transferred to an additional recirculation circuit that includes an additional extraction machine, an additional deaeration apparatus and an additional heat exchange apparatus, said additional recirculation circuit being configured in such a way that said heated, or cooled, food product, is arranged to be transferred into said additional extraction machine where is mixed with a predetermined flow of said exiting product arranged to exchange a predetermined thermal power with the recirculated food product.

15. The plant according to claim 1, wherein said heat exchange apparatus is configured to heat said food product up to a temperature of enzymatic inactivation Tie, with Tie>T0, in such a way to cause the enzymatic inactivation of said food product.

16. The plant according to claim 2, further comprising a second inlet through which said extracted heated, or cooled, and deaerated and/or concentrated food product is arranged to be introduced into said extraction machine externally to said sieve.

17. The plant according to claim 3, further comprising a second inlet through which said extracted heated, or cooled, and deaerated and/or concentrated food product is arranged to be introduced into said extraction machine externally to said sieve.

18. The plant according to claim 2, further comprising:
a pumping device and a valve for moving said food product; and
a control unit that is operatively connected with said pumping device and with said valve, said control unit being configured to adjust the flow between said extraction machine, said deaeration and/or concentration apparatus, and said heat exchange apparatus, in such a way to provide a predetermined value of thermal power to said extracted food product from said heated, cooled, deaerated and/or concentrated product that is recirculated into said extraction machine.

19. The plant according to claim 3, further comprising:
a pumping device and a valve for moving said food product; and
a control unit that is operatively connected with said pumping device and with said valve, said control unit being configured to adjust the flow between said extraction machine, said deaeration and/or concentration apparatus, and said heat exchange apparatus, in such a way to provide a predetermined value of thermal power to said extracted food product from said heated, cooled, deaerated and/or concentrated product that is recirculated into said extraction machine.

* * * * *